Patented Mar. 6, 1951

2,543,959

UNITED STATES PATENT OFFICE 2,543,959

MAGNESIUM OXYCHLORIDE CEMENT MIX AND METHOD OF MAKING

William C. Eastin, Palo Alto, Calif., assignor to Food Machinery and Chemical Corporation, Wilmington, Del., a corporation of Delaware No Drawing. Application September 1, 1945, Serial No. 614,091

17 Claims. (Cl. 106—106)

This invention relates to cementitious compositions and particularly to magnesium oxychloride cements wherein seawater magnesia is employed.

In the past, the magnesia used in oxychloride cements has been obtained from magnesite ores, and when said magnesia has been used there has been no difficulty in contraction as the cement sets. In fact, the problem hitherto has been to control the expansion of calcined magnesite ore cements and not contraction thereof. Ore of sufficiently high quality for use in magnesium oxychloride cements is becoming difficult to obtain, whereas the supply of magnesia obtainable from seawater is practically inexhaustible. Oxychloride cement made from seawater magnesia is stronger than that made from calcined ores and in addition has almost a pure white color. The previous objection has been that oxychloride cement made from seawater magnesia shows excessive contraction (0.3–0.5%). It is desirable that any additive to inhibit contraction be economical in cost and not reduce the strength of the cement to any extent. As an indication of the contraction of various magnesias and the effect of the additive it has been found:

*Per cent contraction measured from ½ hour after final set*

|  | Per cent |
|---|---|
| MgO from ore | 0.10 –0.15 |
| MgO from seawater without additive | 0.30 –0.50 |
| MgO from seawater with additive | 0.021–0.20 |

As an example, seawater magnesia may be obtained by removing calcium sulphate from the seawater bittern, reacting the bittern with lime or calcined dolomite, washing the resulting $Mg(OH)_2$, filtering, and then calcining. Oxychloride cements made with seawater magnesia have heretofore shown extensive contraction during curing after the cement has set which invariably leads to cracking of the cement and pulling away from the molds. The excessive contraction of these cements is attributable for the most part to the physical characteristics of, rather than the impurities in, the seawater magnesia, which differ from those of conventional magnesia obtained from ore, as magnesite, brucite and dolomite. An examination of seawater magnesia as conventionally produced reveals that it is a low bulk density white mass of particles pseudomorphic of magnesium hydroxide, having a bulk density of from 30 to 40 pounds per cubic foot. In contrast thereto magnesia produced from ore is ordinarily pseudomorphic of magnesium carbonate and usually has a bulk density of from 70 to 80 pounds per cubic foot.

The process of the present invention primarily relates to the production of magnesia oxychloride cements from magnesia of this low density character which when compounded with magnesium chloride solution and other conventional ingredients, as fillers, yields cements having excessive or prohibitive contracting tendencies, and the process involves mixing a small amount of a water soluble salt of a phosphoric acid having a lower proportion of combined molecules of water than orthophosphoric acid with such magnesia and with magnesium chloride solution.

The phosphate salts constituting the additive may be referred to collectively as the water soluble salts of the phosphoric acids which contain less water or a lower proportion of water molecules than orthophosphoric acid. The phosphoric acids of which the water soluble salts may be used include the pyrophosphoric, the metaphosphoric acids, and the polyphosphoric acids, the salts being employable in their monomeric or polymeric form. The salts and acids involved may be considered as molecularly dehydrated forms of the ortho salts and acids as distinguished from the so-called dehydration of phosphates by heating merely to drive off water of crystallization or the double-decomposition reactions characterizing hydrolysis. For the purposes of this application sodium pyrophosphate may be considered to be a polyphosphate.

A preferred embodiment of the invention contemplates making the addition of the contraction preventing, inhibiting, or reducing, material to the seawater magnesia after calcining but before addition of the magnesium chloride solution. The addition of water soluble salts of a phosphoric acid having a lower proportion of water molecules than orthophosphoric, preferably sodium pyrophosphate, will substantially eliminate, inhibit, or reduce, to unobjectionable and small proportions, the contraction commonly found in oxychloride cement made from seawater magnesia. Other water soluble salts having a lower proportion of water molecules than orthophosphoric acid have a similar action. Examples of other salts are sodium tripolyphosphate ($Na_5P_3O_{10}$), sodium tetrapolyphosphate, such as sold commercially under the trade name "Quadrafos" ($Na_6P_4O_{13}$), sodium acid pyrophosphate ($Na_2H_2P_2O_7$) sodium metaphosphate, ($NaPO_3$) and ($NaPO_3)_n$, and $Na_{14}P_8O_{27}$. As a further example, potassium pyrophosphate also may be used although it is not quite as effective in reducing contraction as some of the others.

In order to determine the effectiveness of some of the various substances, a series of tests was run as shown in Table I wherein a linear change bar was molded from the cement, said cement being approximately one part seawater magnesia, two parts silex, and five parts testing sand gauged with magnesium chloride solution, the contraction of the bar from one-half hour after final set to maximum contraction being determined with a micrometer. Sodium pyrophosphate was the particular additive selected for the tests but comparable results are obtained with the other additive. The contraction so obtained was compared with the contraction of the cement when no additive was used.

TABLE I

*Effect of different phosphate [1] compounds on contraction and setting time of seawater MgO*

| Additive Used | Per Cent Contraction From ½ hour After Set | Initial Set, min. | Final Set, min. |
|---|---|---|---|
| None | 0.450 | 86 | 186 |
| $Na_4P_2O_7$ (pyro) | 0.037 | 93 | 193 |
| $Na_5P_3O_{10}$ (tripolyphosphate) | 0.044 | 120 | 260 |
| $Na_6P_4O_{13}$ ("Quadrafos") | 0.095 | 120 | 285 |
| $Na_{14}P_8O_{27}$ | 0.090 | 130 | 245 |
| $Na_2H_2P_2O_7$ | 0.033 | 140 | 280 |
| $NaPO_3$ | 0.123 | 95 | 195 |
| $Na_3PO_4$ | 0.320 | 135 | 280 |
| $K_4P_2O_7$ | 0.200 | 126 | 266 |
| $MgSO_4$ | 0.456 | 68 | 183 |

[1] Also $MgSO_4$

It should be noted that magnesium sulphate, which has been used heretofore to control the expansion of calcined ore oxychloride cements, has substantially no effect in preventing or inhibiting contraction.

In order to determine the best concentration range for effective control of contraction, the amount of sodium pyrophosphate (C. P. grade) was varied from 0% to 5% (MgO basis) and the results of the test shown in Table II.

TABLE II

*Effect of varying amounts of sodium pyrophosphate on contraction of seawater oxychloride*

| Amount $Na_4P_2O_7$ Added | Per Cent Contraction From ½ hour After Set | Per Cent Expansion [1] | | |
|---|---|---|---|---|
| | | 1 day | 3 days | 7 days |
| 0 | 0.450 | 0.026 | 0.029 | 0.019 |
| 0.25 | 0.187 | 0.022 | 0.019 | 0.007 |
| 0.50 | 0.092 | 0.025 | 0.022 | 0.010 |
| 1.00 | 0.026 | 0.021 | 0.019 | 0.008 |
| 2.00 | 0.026 | ---- | ---- | ---- |
| 5.00 | 0.021 | ---- | ---- | ---- |

[1] Measured from maximum contraction.

It is noted that there is very little effect in reducing contraction after the percentage reaches 1% and that about 0.25% at least must be added in order to obtain satisfactory results, the best range appearing to be between about 0.5% and 1%. This range holds generally for the other additives mentioned.

Strength tests run on seawater magnesia alone and with 0.5% (MgO basis) sodium pyrophosphate as an additive appear in Table III as compared with a typical calcined ore magnesia cement.

TABLE III

*Strength tests on oxychloride cement made from various samples of magnesia*

| | Modulus of Rupture, #/sq. in. | | Typicl Magnesaia from Ore |
|---|---|---|---|
| | Seawater MgO+Pyro (0.5%) | Seawater MgO | |
| Dry Strength Age: | | | |
| 1 day | 1,053 | 1,120 | 900 |
| 3 days | 1,813 | 1,808 | 1,100 |
| 7 days | 2,393 | 2,535 | 1,300 |
| 21 days | 2,502 | 2,470 | 1,600 |

Strength with varying amounts of additive is shown in Table IV and it is seen that the strength shows no significant difference with varying amounts of additive. Further evidence of the effectiveness was noted in the strength tests when approximately one half of the bars (containing seawater magnesia alone) cracked badly due to stresses set up by contraction, while no sign of cracking was found in the bars containing seawater magnesia with sodium pyrophosphate added thereto.

TABLE IV

*Effect of varying amounts of sodium pyrophosphate on strength of seawater oxychloride cement*

| Amount $Na_4P_2O_7$ Added | Transverse Strength, #/sq. in. | |
|---|---|---|
| | 1 Day | 4 Days |
| ---- | 1,040 | 2,000 |
| 0.50 | 986 | 2,033 |
| 0.75 | 850 | 1,985 |
| 1.00 | 872 | 2,142 |

Various specific mixes may be used for the cement, one of these, for example, being composed of about 25% MgO, 50% fine sand, 15% ground "lime rock," 5% asbestos, 5% $Fe_2O_3$, and 0.70% sodium pyrophosphate (MgO basis). Still another mix comprises 46 parts MgO, 7 parts fine sand, and 30 parts silex, together with 1 part sodium pyrophosphate. In mixes such as these, the material before initial set is quite fluid and the linear change characteristics relatively unimportant. Shortly after final set, however, the cement becomes quite rigid and in the period thereafter, maximum contraction is reached. As a result of this, the material pulls away from the sides of the mold appreciably and cracks will occur. In the case of magnesia derived from ore, the high expansion occurring after final set serves to counteract the initial contraction while in the case of seawater magnesia, very little expansion occurs.

Sodium pyrophosphate of C. P. grade or that made by fusing disodium orthophosphate $$(Na_2HPO_4)$$

at 1000° C. has been used as the additive with good results, such pyrophosphate exhibiting a concoidal fracture, single crystal orientation and being homogeneous.

It has been established that the two reactions largely responsible for the formation of oxychloride cement are:

$$MgO + H_2O \rightarrow Mg(OH)_2 \quad (1)$$

and $$3MgO + MgCl_2 + 11H_2O \rightarrow 3MgO \cdot MgCl_2 \cdot 11H_2O \quad (2)$$

The linear change of a paste composed of seawater magnesia and distilled water was measured with a comparator microscope and the material showed definite contraction, totaling more than 3% with no later expansion, thus showing that reaction (1) results in a decrease in volume. A study made of the amount of slaking taking place when seawater magnesia with and without sodium pyrophosphate is agitated with distilled water shows that 1% sodium pyrophospate almost completely stops the slaking reaction.

TABLE V

*Effect of $Na_4P_2O_7$ on hydration of seawater magnesia*

| Magnesia Sample | Time of Contract with $H_2O$, hrs. | Ig. Loss, Per Cent |
|---|---|---|
| #2662 MgO | 0 | 4.77 |
| #2662 + $Na_4P_2O_7$ (1%) | 3.5 | ¹4.98 |
| #2662 MgO | 3.5 | ¹8.34 |

¹ After drying with acetone and ether.

In the presence of sodium pyrophosphate, reaction (1) is inhibited to a large extent, while reaction (2) is not affected.

Sodium pyrophosphate obviously is converted to magnesium pyrophosphate in the presence of as large an excess of MgO and $MgCl_2$ as exists in an oxychloride cement mix. Experiments carried out to determine whether or not addition of magnesium pyrophosphate itself would control contraction showed that such was not the case. A sample of magnesium pyrophosphate was prepared by dissolving the pyrophosphate in water and adding $MgCl_2$ solution, the precipitate filtered and dried overnight, and then 1% (MgO basis) thereof was added to a mix, and the setting time and contraction determined in a second experiment. Sodium pyrophosphate was dissolved in water and added to the magnesium chloride in an amount such that 1% of sodium pyrophosphate (MgO basis) would be added in the form of magnesium pyrophosphate ($Mg_2P_2O_7$) in suspension. Table VI shows the results obtained and it is seen that only when the sodium pyrophosphate is added to the seawater magnesia that satisfactory results occur. Thus the contraction and setting time effect depends upon the form in which the $Mg_2P_2O_7$ occurs and to be effective in controlling contraction the magnesium pyrophosphate must be precipitated in intimate contact with reacting MgO. This points towards the formation in situ of a protective film around the magnesia particles as a possible mechanism by which contraction is inhibited. It also has been found that if the additive is finely ground, such as 200 mesh, the material is more effective.

TABLE VI

*Form of pyrophosphate as additive-effect on contraction and time of set*

| Method of Addition | Contraction, Per Cent | Initial Set, min. | Final Set, min. |
|---|---|---|---|
| MgO (alone) | 0.450 | 86 | 186 |
| MgO + $Na_4P_2O_7$ (1%)¹ | 0.026 | 93 | 193 |
| MgO + $Mg_2P_2O_7$ (1%)¹ | 0.432 | 85 | 180 |
| $Mg_2P_2O_7$ in $MgCl_2$ Solution² | 0.426 | 163 | 345 |

¹ Dry.  ² Freshly precipitated.

The additives of the present invention also may be used to inhibit hydration of magnesium oxide, seawater and other types, in other fields than oxychloride cements such as inhibiting the thickening of a slurry of magnesium oxide and other solid materials used in the fabrication of certain electrical insulators.

It is to be understood, of course, that the invention is not limited by an inadequate understanding of the theory of operation and that modifications may be made without departing from the spirit of the invention or the scope of the appended claims.

What is claimed:

1. The process of producing magnesia oxychloride cements which do not contract excessively during curing, from a magnesia derived by the calcination of magnesium hydroxide precipitated from a magnesium compound in an aqueous solution and which yields cements having prohibitive contracting tendencies when compounded with magnesium chloride solution and fillers comprising, mixing a small amount sufficient to inhibit excessive contraction of a water-soluble salt of a phosphoric acid having a lower proportion of combined molecules of water than orthophosphoric acid with magnesia having such property, with a filler and with magnesium chloride solution.

2. The process of producing magnesia oxychloride cements which do not contract excessively during curing, from a magnesia derived by the calcination of magnesium hydroxide precipitated from a magnesium compound in an aqueous solution and which yields cements having prohibitive contracting tendencies when compounded with magnesium chloride solution and fillers comprising, mixing a small amount sufficient to inhibit excessive contraction of a sodium salt of pyrophosphoric acid with magnesia having such property, with a filler and with magnesium chloride solution.

3. The process of producing magnesia oxychloride cements which do not contract excessively during curing, from a magnesia derived by the calcination of magnesium hydroxide precipitated from a magnesium compound in an aqueous solution and which yields cements having prohibitive contracting tendencies when compounded with magnesium chloride solution and fillers comprising, mixing a small amount sufficient to inhibit excessive contraction of sodium pyrophosphate with magnesia having such property, with a filler and with magnesium chloride solution.

4. The process of producing magnesia oxychloride cements which do not contract excessively during curing, from a magnesia derived by the calcination of magnesium hydroxide precipitated from a magnesium compound in an aqueous solution and which yields cements having prohibitive contracting tendencies when compounded with magnesium chloride solution and fillers comprising, mixing a small amount sufficient to inhibit excessive contraction of sodium acid pyrophosphate with magnesia having such property, with a filler and with magnesium chloride solution.

5. The process of producing magnesia oxychloride cements which do not contract excessively during curing, from a magnesia derived by the calcination of magnesium hydroxide precipitated from a magnesium compound in an aqueous solution and which yields cements having prohibitive contracting tendencies when compounded with magnesium chloride solution and fillers comprising, mixing a small amount sufficient to inhibit excessive contraction of sodium polyphosphate with magnesia having such property, with a filler and with magnesium chloride solution.

6. The process of producing magnesia oxychloride cements which do not contract excessively during curing, from a magnesia derived by the calcination of magnesium hydroxide precipitated from a magnesium compound in an aqueous solution and which yields cements having prohibitive contracting tendencies when compounded with magnesium chloride solution and fillers comprising, mixing a small amount sufficient to inhibit excessive contraction of sodium tripolyphosphate with magnesia having such property, with a filler and with magnesium chloride solution.

7. The process of producing magnesia oxychloride cements which do not contract excessively during curing, which comprises mixing a small amount sufficient to inhibit excessive contraction of a water-soluble salt of a phosphoric acid having a lower proportion of combined molecules of water than orthophosphoric acid with low bulk density magnesia having a bulk density of 30 to 40 pounds per cubic foot obtained by the calcination of magnesium hydroxide precipitated from a magnesium compound in an aqueous solution and which yields cements having prohibitive contracting tendencies when compounded with magnesium chloride solution and fillers, with a filler and with magnesium chloride solution.

8. The process of producing magnesia oxychloride cements which do not contact excessively during curing, which comprises compounding a small amount sufficient to inhibit excessive contraction of a water-soluble salt of a phosphoric acid having a lower proportion of combined molecules of water than orthophosphoric acid with low bulk density magnesia obtained by the calcination of precipitated magnesium hydroxide originating in natural waters and precipitated from an aqueous solution of a magnesium salt in aqueous solution and which yields cements having prohibitive contracting tendencies when compounded with magnesium chloride solution and fillers, with a filler and also with magnesium chloride solution.

9. The process of preventing excessive contraction of magnesia oxychloride cement mixes having such tendency during curing, which comprises mixing a small amount sufficient to inhibit excessive contraction of sodium pyrophosphate with the magnesia employed in compounding the magnesia oxychloride cement mix, which magnesia is one derived by the calcination of magnesium hydroxide precipitated from a magnesium compound in an aqueous solution and which yields cements having prohibitive contracting tendencies when compounded with magnesium chloride solution and fillers.

10. The process of producing magnesia oxychloride cements which do not contract excessively during curing, from a magnesia derived by the calcination of magnesium hydroxide precipitated from a magnesium compound in an aqueous solution and which yields cements having prohibitive contracting tendencies when compounded with magnesium chloride solution and fillers comprising, mixing a small amount sufficient to inhibit excessive contraction of a sodium pyrophosphate made by fusing disodium orthophosphate with magnesia having such property, with a filler and with magnesium chloride solution.

11. A slowly hydrating magnesia composition composed of finely divided magnesia obtained by the calcination of magnesium hydroxide precipitated from a magnesium compound in an aqueous solution and which yields cements having prohibitive contracting tendencies when compounded with magnesium chloride solution and fillers and a small amount sufficient to inhibit excessive contraction of a water-soluble salt of a phosphoric acid having a lower proportion of combined molecules of water than orthophosphoric acid.

12. In the production of magnesia oxychloride cements from low bulk density magnesia derived by the calcination of magnesium hydroxide precipitated from a magnesium salt in aqueous solution and which yields cements having prohibitive contracting tendencies when compounded with magnesium chloride solution and fillers, the method of inhibiting excessive contraction of the cement during curing which comprises including in such cement mix a small amount adequate to inhibit contraction of a water-soluble salt of a phosphoric acid having a lower proportion of combined molecules of water than orthophosphoric acid.

13. A composition of matter for use in compounding magnesia oxychloride cements composed of sea water magnesia derived by the calcination of magnesium hydroxide precipitated from a magnesium salt in aqueous solution and which yields cements having prohibitive contracting tendencies when compounded with magnesium chloride solution and fillers and a small amount sufficient to inhibit excessive contraction of a water-soluble salt of a phosphoric acid having a lower proportion of combined molecules of water than orthophosphoric acid.

14. A composition of matter for use in compounding magnesia oxychloride cements composed of a magnesia derived by the calcination of magnesium hydroxide precipitated from a magnesium compound in an aqueous solution and which yields cements having prohibitive contracting tendencies when compounded with magnesium chloride solution and fillers and a small amount sufficient to inhibit excessive contraction of a water-soluble, alkali-metal salt of a phosphoric acid having a lower proportion of combined molecules of water than orthophosphoric acid.

15. A composition of matter for use in compounding magnesia oxychloride cements composed of a magnesia derived by the calcination of magnesium hydroxide precipitated from a magnesium compound in an aqueous solution and which yields cements having prohibitive contracting tendencies when compounded with magnesium chloride solution and fillers and a small amount sufficient to inhibit excessive contraction of a sodium salt of a phosphoric acid having a lower proportion of combined molecules of water than orthophosphoric acid.

16. A composition of matter for use in compounding magnesia oxychloride cements composed of a magnesia derived by the calcination of magnesium hydroxide precipitated from a magnesium compound in an aqueous solution and which yields cements having prohibitive contracting tendencies when compounded with magnesium chloride solution and fillers and a small amount sufficient to inhibit excessive contraction of sodium pyrophosphate.

17. A composition of matter for use in compounding magnesia oxychloride cements, composed of a magnesia derived by the calcination of magnesium hydroxide precipitated from a magnesium compound in an aqueous solution and which yields cements having prohibitive contracting tendencies when compounded with magnesium chloride solution and fillers and a small amount sufficient to inhibit excessive contraction of sodium tripolyphosphate.

WILLIAM C. EASTIN.

REFERENCES CITED

The following references are of record in the file of this patent:

UNITED STATES PATENTS

| Number | Name | Date |
|---|---|---|
| 1,468,930 | Sullivan | Sept. 25, 1923 |
| 2,351,641 | Sohl et al. | June 20, 1944 |

OTHER REFERENCES

Mellor's Modern Inorganic Chemistry, Revised Ed. 1939, (page 729). (Copy in Division 38.)